United States Patent

Brown et al.

[11] Patent Number: 5,604,055
[45] Date of Patent: Feb. 18, 1997

[54] OXIDIZED ALKALI METAL-HALOGEN CELL CASE

[75] Inventors: W. Richard Brown, Clarence Center; Sally A. Smesko, North Tonawanda; Esther S. Takeuchi, East Amherst, all of N.Y.

[73] Assignee: Wilson Greatbatch Ltd., Clarence, N.Y.

[21] Appl. No.: 602,279

[22] Filed: Feb. 16, 1996

[51] Int. Cl.⁶ .................................................. H01M 2/02
[52] U.S. Cl. .......................... 429/176; 429/101; 429/211
[58] Field of Search ............................ 429/176, 211, 429/101

[56] References Cited

U.S. PATENT DOCUMENTS 1,859,735  5/1932  George .
4,244,755  1/1981  Brockway et al. ...................... 148/16
4,401,736  8/1983  Zayatz ..................................... 429/211
5,080,671  1/1992  Oron et al. .............................. 623/16

Primary Examiner—John S. Maples
Attorney, Agent, or Firm—Hodgson, Russ, Andrews, Woods & Goodyear LLP

[57] ABSTRACT

Heat treating the inner, contact surface of an electrochemical cell casing in an oxidizing atmosphere such as air to render the inner surface thereof essentially contamination free and suitable as a current collector, is described. The casing is preferably of stainless steel and houses the alkali metal-halogen couple in a case-positive configuration. The oxidized cases are ready for cell assembly upon cooling and cell electrical performance is maintained without the need for wet chemical treatment of any kind.

9 Claims, 3 Drawing Sheets

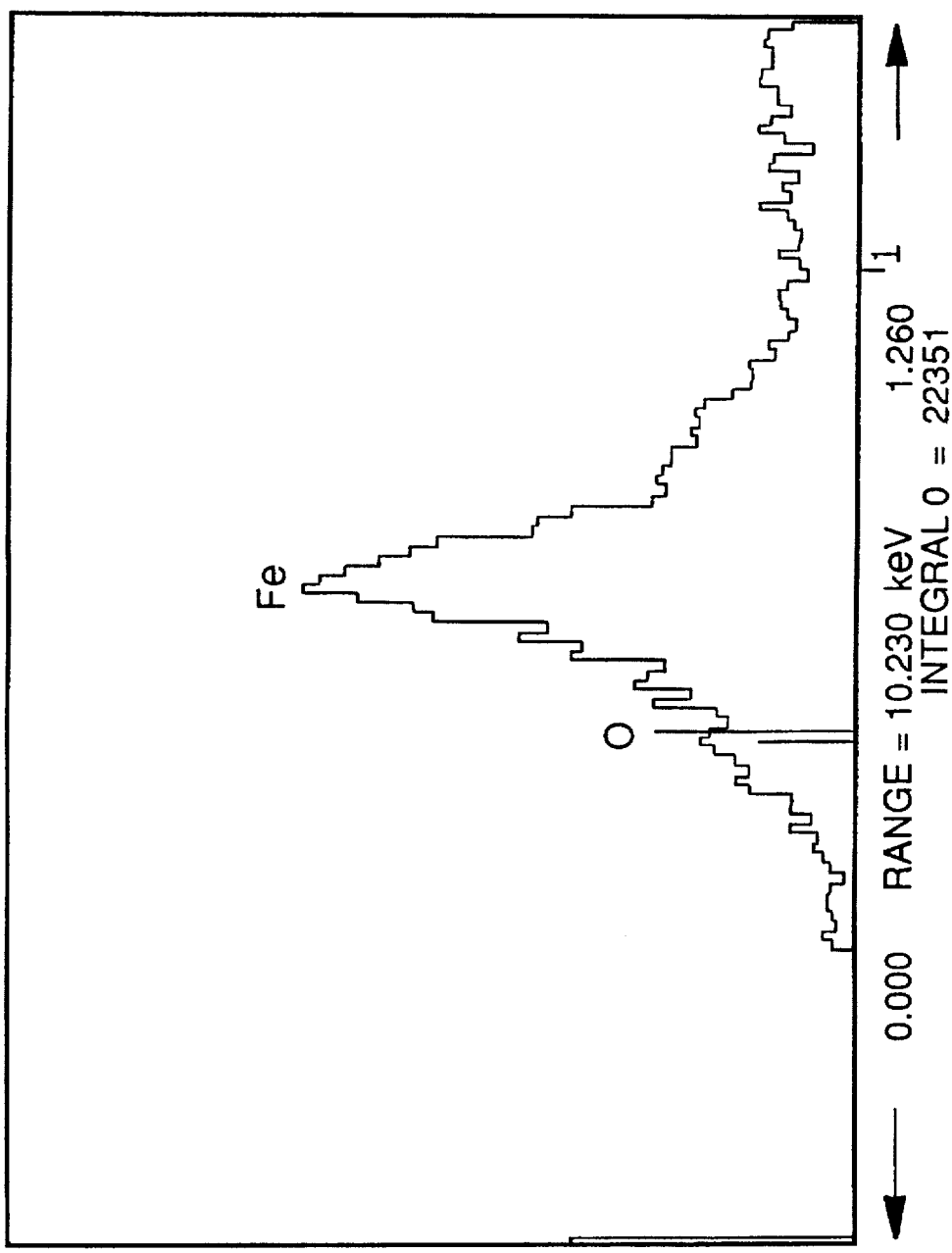

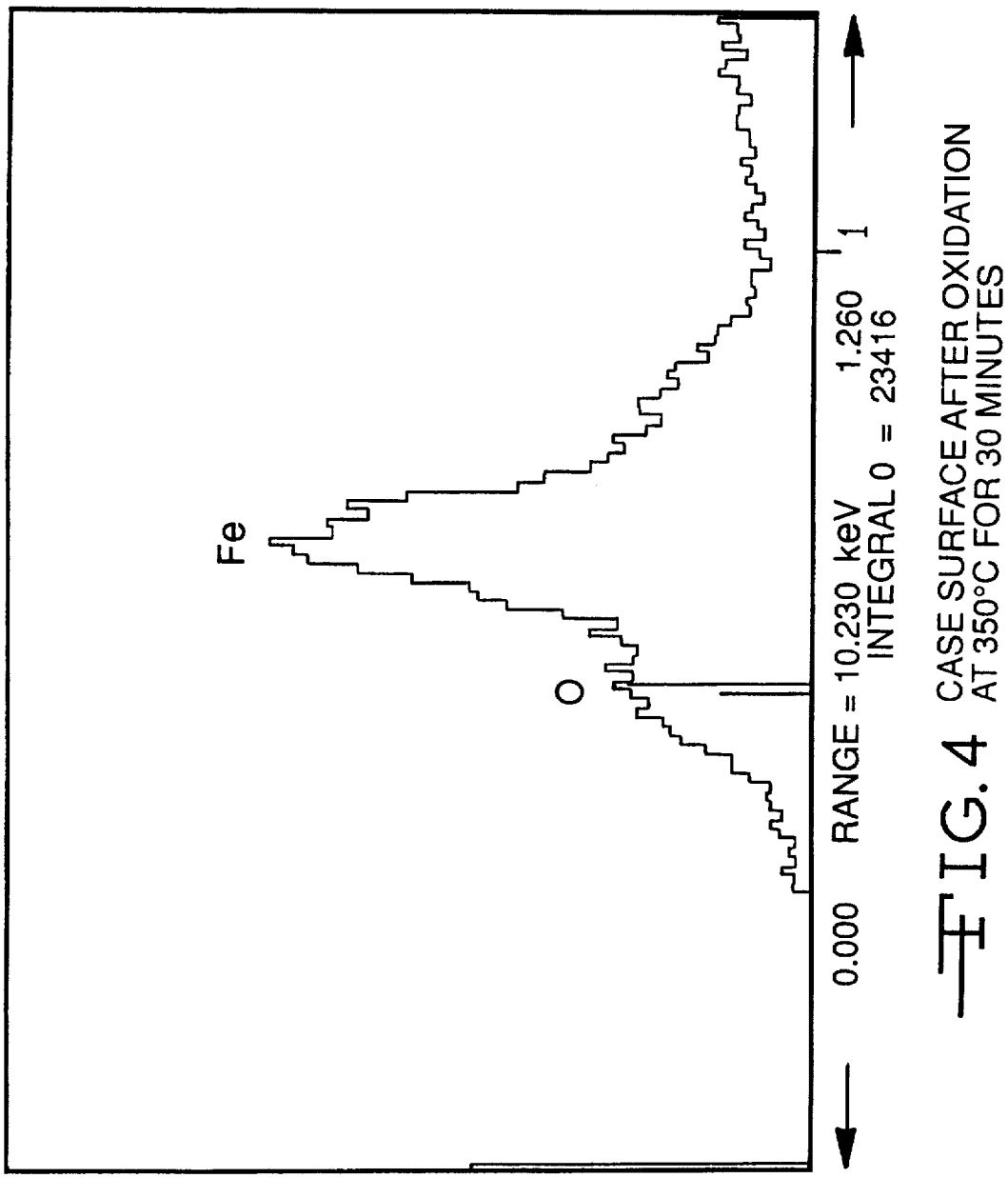
FIG. 4 CASE SURFACE AFTER OXIDATION AT 350°C FOR 30 MINUTES

OXIDIZED ALKALI METAL-HALOGEN CELL CASE

BACKGROUND OF THE INVENTION

1. Field Of The Invention

The present invention generally relates to a solid state primary cell, and more particularly, to maintenance of discharge performance for alkali metal-halogen cells with simplified methods of making the same. The cells are preferably housed inside of stainless steel cases and the improvements are realized by heat treating the inner surface of the case in an oxidizing atmosphere according to the present invention prior to introduction of the cell active components.

2. Prior Art

The condition of the internal surface of the stainless steel casings employed in lithium/halogen cells, particularly lithium/iodine cells, has been determined to be critical to cell electrical performance. In many case-positive cell designs, the casing inner surface or wall serves as the cathodic current collector, facilitating electron transfer during discharge. Voltage, impedance and delivered capacity at low current drains can all be adversely affected by contaminants which may be present on casings in their condition as received from suppliers.

Conventional practice in the preparation of the cell casing used in construction of alkali metal-halogen cells is to first acid treat the case to remove surface contamination. With a stainless steel case, acid bright dipping (known as Diversey®) is very effective, but it is a time-consuming and increasingly expensive process. Approximately three percent of the weight of each case is removed, dissolved in the acid along with any surface contaminants also present. Thus, bath life becomes limited due to the increasing concentration of metal ions in the costly, strong acid solution with use. In addition, the total process requires two active pretreatment steps, along with copious rinsing and final solvent drying. The acid dipping process is labor-intensive and time consuming. Finally, environmentally sound disposal of the heavy metal-laden spent acid and rinse wastes is becoming prohibitively expensive.

There is therefore a need for a casing, preferably a stainless steel case, for an alkali metal-halogen cell wherein the casing inner surface is essentially free of contaminants to ensure satisfactory electrical performance during discharge. The alkali metal-halogen electrochemical couple is typically constructed in a case-positive configuration with the case wall serving as the cathodic current collector. A contamination free inner surface for the casing facilitates electron transfer during discharge. It would, therefore, be highly desirable to provide the foregoing in a time-saving, economical and environmentally sound manner.

SUMMARY OF THE INVENTION

The present invention is directed to heat treating the inner surface of electrochemical cell cases in an oxidizing atmosphere such as air. The heat treatment is carried out on cell cases in the as-annealed condition received from suppliers without the need for pretreatment of any kind. The cell cases are preferably of stainless steel and are used to construct alkali metal-halogen cells of the central anode, case-positive configuration. The oxidized heat treated cases are ready for cell assembly upon cooling and cell electrical performance is maintained without the need for wet chemical treatment.

A preferred electrochemical system is the lithium-iodine couple.

According to the present invention, the lithium-iodine couple is housed in an oxidized, heat treated casing and comprises a lithium anode, a solid state lithium halide electrolyte, and a solid state electronically conductive cathode that contains iodine. The anode reaction is:

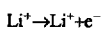

and the cathode reaction is:

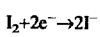

giving an overall reaction of:

This electrochemical system is especially advantageous in that lithium has a high energy density, as the most electropositive metal with the lowest equivalent weight, and the electrolyte formed on discharge of the cell is LiI, the lithium salt having the highest ionic conductivity, much higher than the ionic conductivity of divalent halides.

The cathode iodine may be free iodine intimately admixed with a solid electronic conductor or, preferably, it is at least partially chemically bound as in organic-iodine charge transfer complexes. The electrolyte is preferably lithium iodide, which may be formed in situ by contacting the anode and cathode surfaces, whereby lithium reacts with iodine in the cathode to form a solid lithium iodide electrolyte layer contacting the anode and cathode. Alternatively, the electrolyte includes a coating of lithium iodide or other lithium halide on the lithium anode formed by reaction of the lithium with iodine or another halogen. The cathode is contacted against the inner surface of the heat treated casing which serves as the cathode current collector.

Lithium-iodine cells fabricated in casings that have been heat treated according to the present invention have a high operating voltage, typically an open circuit voltage of about 2.7 to 2.8 volts depending primarily on cell design and the cathode material. Further, energy densities of between about 0.8 and 1.0 Wh/cc are typically obtained with this electrochemical couple housed in cell casings treated according to the prior art by acid bright dipping (Diversey®). On the other hand, energy densities of between about 0.8 to 0.9 Wh/cc have been obtained during discharge at room temperature of lithium/iodine cells housed in air oxidized heat treated casings according to the present invention. Thus, the present invention is an improved manufacturing process for this electrochemical couple that does not compromise discharge efficiency.

The above aspects of the present invention will become more apparent to those skilled in the art by reference to the following description and to the following drawings.

BRIEF DESCRIPTION OF THE DRAWINGS

FIGS. 3 and 4 are graphs of the energy-dispersive X-ray analysis of stainless steel cell cases in the as-received and oxidation heat treated condition of the present invention, respectively.

DETAILED DESCRIPTION OF THE INVENTION

Figure 1:
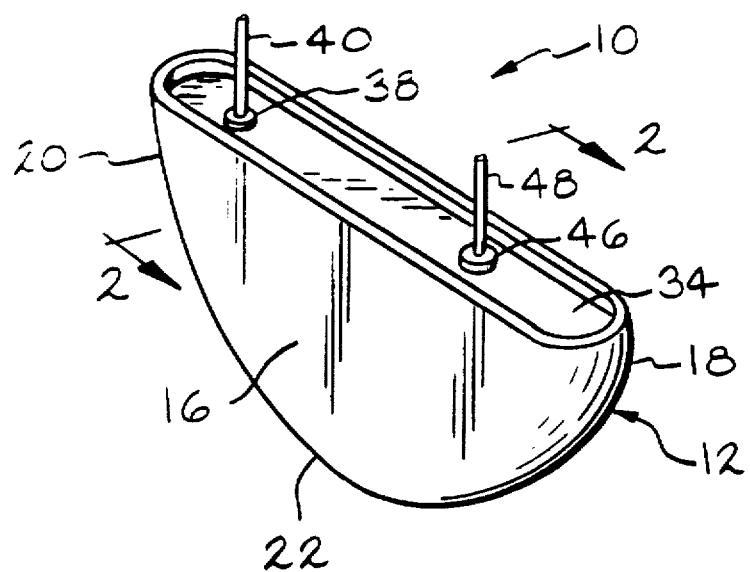
FIG. 1 is a perspective view of an exemplary alkali metal-halogen cell 10 housed in an oxidized heat treated casing 12 according to the present invention.
Figure 2:
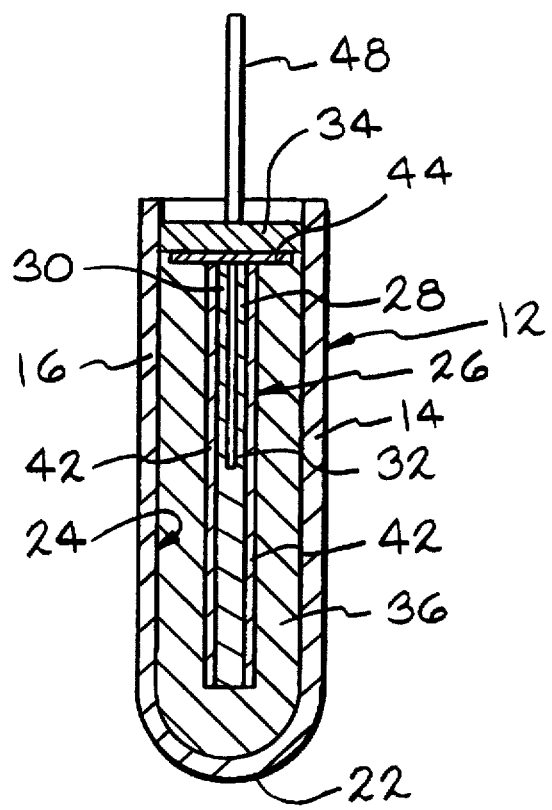
FIG. 2 is an enlarged sectional view taken about on line 2—2 in FIG. 1.

Referring now to FIGS. 1 and 2, there is shown an exemplary alkali metal-halogen electrochemical cell 10 housed inside of a casing 12 that has been oxidized heat treated according to the present invention. The casing 12 is of metal such as stainless steel and includes spaced apart side walls 14,16 joined by curved end walls 18,20 and a curved bottom wall 22. In accordance with the present invention, prior to assembly of the cell 10, the casing 12 is heated at an elevated temperature in an oxidizing atmosphere such as air for a period of time sufficient to render the inner surface 24 of the casing essentially free of contaminants to ensure satisfactory electrical performance of the cell during discharge. According to a preferred aspect of the present invention, the casing 12 is heated in air at a temperature of at least about 200° C. to about 350° C. for about thirty minutes prior to cell assembly. The oxidized casing is ready for cell assembly upon cooling.

The electrochemical cell 10 housed inside of the oxidized heat treated casing 12 includes an anode generally designated 26 and comprising alkali metal, preferably a pair of lithium plates 28,30 pressed together and bonded against an anode current collector 32 which is a portion of the anode conductor means of the cell. Current collector 32 thus is sandwiched between plates 28,30 and can be of various forms such as a length of wire, a strand or ribbon, or a mesh or screen. Current collector 32 is of metal such as nickel or nickel alloy. Each of the plates 28,30 in the cell of FIG. 2 has generally planar, oppositely directed parallel surfaces. Plate 28 is identical to plate 30 in size and peripheral outline, the two plates being in registry or in alignment when pressed together. The lithium anode may also be deposited on the current collector 32 by vacuum deposition, electroplating or other conventional methods.

The open top of casing 12 housing the anode 26 and current collector 32 positioned therein, as shown in FIG. 2, is closed by a lid 34 provided with a fill opening (not shown). Then, the halogen-containing cathode material 36 is introduced into the casing 12 through the fill opening provided in lid 34 such that the cathode material is in operative contact with the anode 26 and with the sides 14,16, bottom 22 and end walls 18,20 of the conductive metal casing 12 which serves as a cathode current collector. The cathode material 36 preferably comprises a charge transfer complex of an organic material and iodine, although any other cathode active material may be used that is electronically conductive and contains available iodine for the electrochemical reaction.

Charge transfer complexes are a well-known class of materials that have two components, one an electron donor, the other an electron acceptor, that form weakly bonded complexes that exhibit electronic conductivity higher than either component. Suitable charge transfer complexes for this invention consist of an organic donor component and iodine, the electron acceptor, preferably having a conductivity of greater than about $2.5 \times 10^{-4}$ ohm/cm. The charge transfer complexes are in chemical equilibrium with some small amount of free iodine that is available for electrochemical reaction. These charge transfer complexes have a wide range of electronic conductivity, and if the conductivity is low, the current output will be comparatively low because of the high internal ohmic resistance. Cathodes containing intimate mixtures of such low conductivity complexes with powdered graphite or inert metal have high conductivities and can provide electrical discharge performance comparable to cells using high conductivity complexes.

In particular, the cathode material 36 is prepared by heating the organic material mixed with iodine to a temperature greater than the crystallization temperature of iodine, for example about 300° F. The amount of iodine should be greater than about 50 percent by weight of the resulting mixture so that enough iodine is available in the cathode material to provide sufficient conductivity for proper cell operation. The resulting mixture is a viscous, flowable substance which is preferably introduced into the cell casing 12 by flowing it through the above mentioned fill opening in lid 34. When filling is completed, a closure element 38, preferably also of stainless steel, or the like, is welded to the lid 34 in the fill opening and a terminal lead 40 is spot welded to closure, either before or after the closure 38 is welded to lid 34.

Suitable charge transfer complexes may be prepared using as organic donor components polycyclic aromatic compounds, such as, for example, pyrene, perylene, anthracene, naphthalene, erythrosine, azulene and fluorene; organic polymers, such as, for example, polyethylene, polypropylene, polystyrene, polypyrrole, polyamides and polyvinyls; or heterocyclic compounds, containing nitrogen or sulfur, such as, for example, phenothiazine, phenazine, 10-phenylphenophiozine, thianthrene, 10-methylthiazinc and methalyineblue; and polymerized or polymerizable compounds in which a heterocyclic nitrogen moiety is incorporated as a side chain or substituent, especially vinyl compounds and polymers, such as poly-2-vinyl quinoline, poly-2-vinyl pyridine, poly-4-vinyl pyridine, poly-5-vinyl-2-methyl-pyridine and poly-N-vinyl carbazole. The proportions of iodine to organic component can be varied over a wide range, although a high proportion of uncomplexed iodine in the cathode generally increases internal cell resistance. Other iodine containing cathodes that are electronically conductive may also be used, such as mixtures of iodine and carbon or graphite.

A lithium iodide electrolyte 42 is formed in situ by reaction of the iodine present in the cathode with the lithium anode. It is equally satisfactory, and in some instances preferable, to form a film of lithium salt electrolyte on the anode surface abutting the cathode prior to cell assembly, most conveniently by exposing the anode surface to dry air or argon atmosphere containing halogen gas or vapor. It will be recognized that additional lithium iodide electrolyte is formed by the electrochemical reaction of the cell.

A strip or band of electrical insulating material 44 serves to insulate anode 26 from the metal lid 34 of casing 12 in a completed or assembled cell. An anode lead (not shown) extends from the anode current collector 32 through an insulator and seal structure 46 and becomes an anode terminal lead 48 which extends through lid 34. For a more detailed description of such an alkali metal-halogen cell, reference may be made to U.S. Pat. No. 4,401,736 issued Aug. 30, 1983 entitled Anode Assembly For Lithium Halogen Cell and assigned to the assignee of the present invention, the disclosure of which is hereby incorporated by reference.

The above described exemplary alkali metal-halogen electrochemical cell housed in the oxidized heat treated casing according to the present invention performs as well as or better than a comparable cell having a case treated by the more costly acid-cleaning process of the prior art.

The following example describes the manner and process of carrying out the present invention in an electrochemical cell, and this example sets forth the best mode contemplated by the inventors of carrying out the invention, but it is not to be construed as limiting.

EXAMPLE I

Lithium/iodine cells of two differing central anode, case-positive configurations similar in construction to the exemplary alkali metal-halide cell 10 just described and, hereinafter referred to as Design 1 and Design 2, where used as test vehicles. The cells were constructed to deliver rate capacities of 1.2 Ah for Design 1, and 0.60 Ah for Design 2. Stainless steel cases were oxidized for thirty minutes in air at temperatures ranging from 200° C. to 350° C., acid treated as usual, or left untreated and used as-received. The presence of oxide was detected visually as a slight color change, and by energy-dispersive X-ray analysis of the case surface. In FIGS. 3 and 4, it is shown that the oxygen peak located at approximately 0.530 keV is elevated in the oxidized cases (FIG. 4) relative to the as-received (unoxidized) cases (FIG. 3).

Three groups of cells were fabricated: one with casings oxidation heat treated according to the present invention, a second with casings acid treated and the third with casings left untreated.

After fabrication, all cells were preconditioned at 37° C. by discharge under 6.98K loads for a period of 60 hours, followed by placement under 100K loads for 24 hours. Closed circuit voltage and 1 kHz internal impedance readings were recorded throughout this preconditioning period.

At beginning-of-life, alkali metal-halogen cells typically are characterized by high loaded voltages and low internal impedances. As shown, in Tables 1 and 2, all oxidation conditions according to the present invention, i.e. oxidation at between 200° C. to 350° C. for thirty minutes, produced cells with electrical discharge characteristics equaling or exceeding those of cells housed in acid treated cases from the same case lot.

TABLE 1

Design 1

| S/N | Case Treatment | Final 100K loaded voltage, mv | Final 100K loaded impedance, ohms |
|---|---|---|---|
| 92089 | as received | 2797 | 42 |
| 92091 | | 2797 | 41 |
| 92093 | | 2798 | 44 |
| 92095 | | 2796 | 43 |
| 92097 | | 2797 | 43 |
| 92099 | | 2797 | 42 |
| | | 2797 ± 1 | 43 ± 1 |
| 92101 | acid | 2798 | 45 |
| 92103 | treated | 2798 | 41 |
| 92105 | | 2798 | 46 |
| 92107 | | 2798 | 49 |
| 92109 | | 2798 | 47 |
| 92111 | | 2798 | 45 |
| | | 2798 ± 0 | 46 ± 3 |
| 92113 | air oxidation | 2798 | 38 |
| 92115 | | 2798 | 43 |
| 92117 | 200° C. | 2797 | 41 |
| 92119 | 30 minutes | 2798 | 41 |
| 92121 | | 2798 | 44 |
| 92123 | | 2798 | 43 |
| | | 2798 ± 0 | 42 ± 2 |
| 92125 | air oxidation | 2798 | 42 |
| 92127 | | 2798 | 39 |
| 92129 | 250° C. | 2797 | 42 |
| 92131 | 30 minutes | 2797 | 43 |
| 92133 | | 2798 | 42 |
| 92135 | | 2797 | 43 |
| | | 2798 ± 1 | 42 ± 1 |
| 92137 | air oxidation | 2798 | 36 |
| 92139 | | 2798 | 37 |
| 92141 | 300° C. | 2798 | 40 |

TABLE 1-continued

Design 1

| S/N | Case Treatment | Final 100K loaded voltage, mv | Final 100K loaded impedance, ohms |
|---|---|---|---|
| 92143 | 30 minutes | 2797 | 45 |
| 92145 | | 2798 | 39 |
| 92147 | | 2797 | 44 |
| | | 2798 ± 1 | 40 ± 4 |
| 92149 | air oxidation | 2797 | 43 |
| 92151 | | 2798 | 39 |
| 92153 | 350° C. | 2797 | 40 |
| 92155 | 30 minutes | 2797 | 43 |
| 92157 | | 2797 | 43 |
| 92159 | | 2797 | 46 |
| | | 2797 ± 0 | 42 ± 3 |

TABLE 2

Design 2

| S/N | Case Treatment | Final 100K loaded voltage, mv | Final 100K loaded impedance, ohms |
|---|---|---|---|
| 92017 | as received | 2786 | 77 |
| 92019 | | 2787 | 75 |
| 92020 | | 2791 | 69 |
| 92024 | | 2792 | 67 |
| 92026 | | 2790 | 75 |
| 92027 | | 2792 | 71 |
| | | 2790 ± 3 | 72 ± 4 |
| 92031 | acid | 2796 | 72 |
| 92032 | treated | 2796 | 72 |
| 92034 | | 2796 | 72 |
| 92035 | | 2795 | 78 |
| 92037 | | 2795 | 71 |
| 92039 | | 2795 | 75 |
| | | 2796 ± 1 | 73 ± 3 |
| 92042 | air oxidation | 2794 | 68 |
| 92044 | | 2793 | 71 |
| 92046 | 200° C. | 2794 | 70 |
| 92048 | 30 minutes | 2793 | 63 |
| 92050 | | 2795 | 66 |
| 92052 | | 2792 | 67 |
| | | 2794 ± 1 | 68 ± 3 |
| 92053 | air oxidation | 2793 | 73 |
| 92055 | | 2794 | 71 |
| 92057 | 250° C. | 2793 | 75 |
| 92059 | 30 minutes | 2794 | 76 |
| 92061 | | 2793 | 69 |
| 92063 | | 2794 | 69 |
| | | 2794 ± 1 | 72 ± 3 |
| 92065 | air oxidation | 2794 | 69 |
| 92068 | | 2795 | 63 |
| 92069 | 300° C. | 2795 | 62 |
| 92071 | 30 minutes | 2796 | 66 |
| 92074 | | 2795 | 72 |
| 92076 | | 2795 | 68 |
| | | 2795 ± 1 | 67 ± 4 |
| 92078 | air oxidation | 2795 | 72 |
| 92080 | | 2795 | 69 |
| 92081 | 350° C. | 2795 | 75 |
| 92083 | 30 minutes | 2794 | 70 |
| 92084 | | 2795 | 66 |
| 92087 | | 2795 | 67 |
| | | 2795 ± 01 | 70 ± 3 |

The oxidation process of the present invention is seen to have caused the cathodic current collectors, i.e., the inner case surfaces, to perform as effectively as those which have been acid-treated according to the prior art. The high loaded cell voltage is maintained and internal impedance is typically lowered.

It is appreciated that various modifications to the inventive concepts described herein may be apparent to those skilled in the art without departing from the spirit and scope of the present invention defined by the hereinafter appended claims.

What is claimed is:

1. An alkali metal-halogen electrochemical cell comprising: a casing of an electrically conductive material; an alkali metal anode positioned within the casing; an anode conductor means operatively connected to the anode and extending through the casing wherein a sealing means provides for sealing the anode conductor means from the remainder of the cell; and cathode means comprising halogen-containing material within the casing and in operative contact with an exposed surface of the anode and with a major portion of an inner surface of the casing in a manner such that the casing serves as a cathode current collector, the improvement comprising:

the electrically conductive casing having at least the inner surface comprised of a layer of an oxide characterized as formed by subjecting the casing to oxidation at an elevated temperature in an oxygen-containing environment.

2. The electrochemical cell of claim 1 wherein the casing comprises stainless steel.

3. The electrochemical cell of claim 1 wherein the oxidizing atmosphere is air.

4. The electrochemical cell of claim 1 wherein the elevated temperature is at least about 200° C. for about thirty minutes.

5. The electrochemical cell of claim 1 wherein the elevated temperature is in a range of between about 200° C. to about 350° C.

6. The electrochemical cell of claim 1 wherein the anode comprises lithium.

7. The electrochemical cell of claim 1 wherein the halogen-containing material comprising the cathode includes iodine.

8. The electrochemical cell of claim 1 wherein the cathode comprises a charge transfer complex of an organic electron donor material and iodine.

9. The electrochemical cell of claim 1 wherein the casing comprises stainless steel characterized as having been heated in air at a temperature of at least about 200° C. for about thirty minutes.

* * * * *